(12) United States Patent
Tanaka

(10) Patent No.: US 9,197,388 B2
(45) Date of Patent: Nov. 24, 2015

(54) RADIO BASE STATION AND CONTROL METHOD FOR THE SAME

(75) Inventor: Takanori Tanaka, Sagamihara (JP)

(73) Assignee: KYOCERA Corporation, Kyoto (JP)

( * ) Notice: Subject to any disclaimer, the term of this patent is extended or adjusted under 35 U.S.C. 154(b) by 352 days.

(21) Appl. No.: 13/699,544

(22) PCT Filed: May 25, 2011

(86) PCT No.: PCT/JP2011/062011
§ 371 (c)(1),
(2), (4) Date: Nov. 21, 2012

(87) PCT Pub. No.: WO2011/148984
PCT Pub. Date: Dec. 1, 2011

(65) Prior Publication Data
US 2013/0064211 A1  Mar. 14, 2013

(30) Foreign Application Priority Data

May 25, 2010 (JP) .................................. 2010-119916
May 25, 2010 (JP) .................................. 2010-119917

(51) Int. Cl.
*H04W 72/04* (2009.01)
*H04W 88/08* (2009.01)
(Continued)

(52) U.S. Cl.
CPC .............. *H04L 5/0053* (2013.01); *H04J 11/00* (2013.01); *H04B 1/70735* (2013.01); *H04W 72/0413* (2013.01)

(58) Field of Classification Search
CPC ...... H04W 76/00; H04W 88/08; H04W 72/04
See application file for complete search history.

(56) References Cited

U.S. PATENT DOCUMENTS 6,434,397 B1    8/2002  Hazama
8,514,788 B2    8/2013  Fujita et al.
(Continued)

FOREIGN PATENT DOCUMENTS

JP    2001-086137 A    3/2001
JP    2009-272827 A    11/2009
(Continued)

OTHER PUBLICATIONS

An Office Action; "Notice of Reason for Rejection," issued by the Japanese Patent Office on Jan. 21, 2014, which corresponds to Japanese Patent Application No. 2010-119916 and is related to U.S. Appl. No. 13/699,544; with English language statement of relevance.
(Continued)

*Primary Examiner* — Hassan Phillips
*Assistant Examiner* — Prenell Jones
(74) *Attorney, Agent, or Firm* — Studebaker & Brackett PC

(57) ABSTRACT

A radio base station eNB which periodically receives uplink control information including CQI through PUCCH, comprising: a storage unit 130 which stores a plurality of combinations of cqi-pmi-ConfigIndex ($I_{CQI/PMI}$) for determining transmission timing of the uplink control information and cqi-PUCCH-ResourceIndex ($n^{(2)}_{PUCCH}$) for determining an orthogonal sequence used for transmitting the uplink control information; and a parameter assignment unit 121 which assigns one of the combinations of cqi-pmi-ConfigIndex ($I_{CQI/PMI}$) and cqi-PUCCH-ResourceIndex ($n^{(2)}_{PUCCH}$) which are stored by the storage unit, to a radio terminal UE connected to the radio base station. The storage unit 130 stores the combinations while combining cqi-pmi-ConfigIndex ($I_{CQI/PMI}$) which possibly cause overlap of the transmission timing of the uplink control information respectively with different cqi-PUCCH-ResourceIndex ($n^{(2)}_{PUCCH}$).

10 Claims, 6 Drawing Sheets

(51) Int. Cl.
*H04W 76/00* (2009.01)
*H04L 5/00* (2006.01)
*H04J 11/00* (2006.01)
*H04B 1/7073* (2011.01)

(56) References Cited

U.S. PATENT DOCUMENTS

| | | | |
|---|---|---|---|
| 8,514,820 B2* | 8/2013 | Cai et al. | 370/336 |
| 2008/0123593 A1 | 5/2008 | Fujita et al. | |
| 2009/0092148 A1 | 4/2009 | Zhang et al. | |
| 2009/0303956 A1* | 12/2009 | Chen et al. | 370/329 |
| 2010/0087221 A1* | 4/2010 | Srinivasan et al. | 455/522 |
| 2011/0002281 A1* | 1/2011 | Terry et al. | 370/329 |
| 2011/0098076 A1* | 4/2011 | Kim et al. | 455/522 |
| 2011/0249578 A1* | 10/2011 | Nayeb Nazar et al. | 370/252 |
| 2011/0267972 A1* | 11/2011 | Yoon et al. | 370/252 |
| 2011/0305226 A1 | 12/2011 | Zhang et al. | |
| 2012/0014331 A1* | 1/2012 | Kuroda | 370/329 |
| 2013/0301572 A1 | 11/2013 | Fujita et al. | |

FOREIGN PATENT DOCUMENTS

| | | |
|---|---|---|
| WO | 00/25539 A1 | 5/2000 |
| WO | 2007/007380 A1 | 1/2007 |
| WO | 2009/038392 A2 | 3/2009 |

OTHER PUBLICATIONS

An Office Action; "Notice of Reason for Rejection," issued by the Japanese Patent Office on Jan. 21, 2014, which corresponds to Japanese Patent Application No. 2010-119917 and is related to U.S. Appl. No. 13/699,544; with English language statement of relevance.

ZTE; 3GPP TSG-RAN WG1 #53; "On the Remaining Issues of PUCCH slot-based CS/OC remapping"; R1-081771; May 9, 2008; Kansas City,USA.

ZTE; 3GPP TSG-RAN WG1 #53 bis; "On the Remaining Issues of PUCCH slot-based CS/OC remapping"; R1-082373; Jul. 4, 2008; Warsaw, Poland.

3GPP TS 36.211 V9.1.0 (Mar. 2010); 3rd Generation Partnership Project; Technical Specification Group Radio Access Network; Evolved Universal Terrestrial Radio Access (E-UTRA); Physical Channels and Modulation (Release 9).

3GPP TS 36.213 V9.1.0 (Mar. 2010); 3rd Generation Partnership Project; Technical Specification Group Radio Access Network; Evolved Universal Terrestrial Radio Access (E-UTRA); Physical layer procedures (Release 9).

International Search Report; PCT/JP2011/062011; Jun. 21, 2011.

* cited by examiner

FIG. 3

| cqi-pmi-ConfigIndex= $I_{CQI/PMI}$ | Value of $N_P$ | Value of $N_{OFFSET,CQI}$ |
|---|---|---|
| $0 \leq I_{CQI/PMI} \leq 1$ | 2 | $I_{CQI/PMI}$ |
| $2 \leq I_{CQI/PMI} \leq 6$ | 5 | $I_{CQI/PMI} - 2$ |
| $7 \leq I_{CQI/PMI} \leq 16$ | 10 | $I_{CQI/PMI} - 7$ |
| $17 \leq I_{CQI/PMI} \leq 36$ | 20 | $I_{CQI/PMI} - 17$ |
| $37 \leq I_{CQI/PMI} \leq 76$ | 40 | $I_{CQI/PMI} - 37$ |
| $77 \leq I_{CQI/PMI} \leq 156$ | 80 | $I_{CQI/PMI} - 77$ |
| $157 \leq I_{CQI/PMI} \leq 316$ | 160 | $I_{CQI/PMI} - 157$ |
| $I_{CQI/PMI} = 317$ | Reserved | |
| $318 \leq I_{CQI/PMI} \leq 349$ | 32 | $I_{CQI/PMI} - 318$ |
| $350 \leq I_{CQI/PMI} \leq 413$ | 64 | $I_{CQI/PMI} - 350$ |
| $414 \leq I_{CQI/PMI} \leq 541$ | 128 | $I_{CQI/PMI} - 414$ |
| $542 \leq I_{CQI/PMI} \leq 1023$ | Reserved | |

FIG. 4

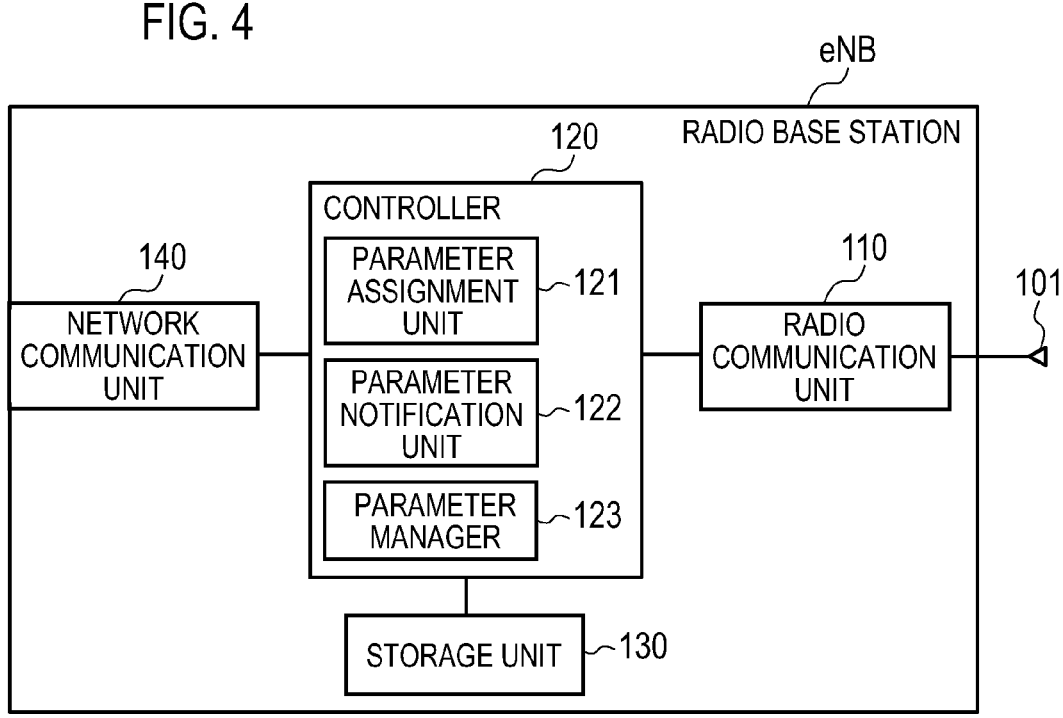

FIG. 5

| cqi-pmi-ConfigIndex = $I_{CQI/PMI}$ | Value of colum n[ cqi-pmi-ResourceIndex ] (= $n^{(2)}_{PUCCH}$) |
|---|---|
| $0 \leq I_{CQI/PMI} \leq 1$ | 0 |
| $2 \leq I_{CQI/PMI} \leq 6$ | 1 |
| $7 \leq I_{CQI/PMI} \leq 16$ | 2 |
| $17 \leq I_{CQI/PMI} \leq 36$ | 3 |
| $37 \leq I_{CQI/PMI} \leq 76$ | 4 |
| $77 \leq I_{CQI/PMI} \leq 156$ | 5 |
| $157 \leq I_{CQI/PMI} \leq 316$ | 6 |
| $I_{CQI/PMI} = 317$ | Reserved |
| $318 \leq I_{CQI/PMI} \leq 349$ | 7 |
| $350 \leq I_{CQI/PMI} \leq 413$ | 8 |
| $414 \leq I_{CQI/PMI} \leq 541$ | 9 |
| $542 \leq I_{CQI/PMI} \leq 1023$ | Reserved |

FIG. 6

| cqi-pmi-ConfigIndex = $I_{CQI/PMI}$ | ASSIGNMENT-MANAGEMENT GROUP ID | THE NUMBER OF ELEMENTS |
|---|---|---|
| $0 \leq I_{CQI/PMI} \leq 1$ | 0x0000 | 2 |
| $2 \leq I_{CQI/PMI} \leq 6$ | 0x0002 | 5 |
| $7 \leq I_{CQI/PMI} \leq 16$ | 0x0007 | 10 |
| $17 \leq I_{CQI/PMI} \leq 36$ | 0x0011 | 20 |
| $37 \leq I_{CQI/PMI} \leq 76$ | 0x0025 | 40 |
| $77 \leq I_{CQI/PMI} \leq 156$ | 0x004D | 80 |
| $157 \leq I_{CQI/PMI} \leq 316$ | 0x009D | 160 |
| $I_{CQI/PMI} = 317$ | Reserved | |
| $318 \leq I_{CQI/PMI} \leq 349$ | 0x013E | 32 |
| $350 \leq I_{CQI/PMI} \leq 413$ | 0x015E | 64 |
| $414 \leq I_{CQI/PMI} \leq 541$ | 0x019E | 128 |
| $542 \leq I_{CQI/PMI} \leq 1023$ | Reserved | |

RADIO BASE STATION AND CONTROL METHOD FOR THE SAME

TECHNICAL FIELD

The prevent invention relates to a radio base station configured to assign parameters for an uplink control channel to a radio terminal and a control method for the radio base station.

BACKGROUND ART

The LTE (Long Term Evolution), standardized by 3GPP (3rd Generation Partnership Project) which is a standardization organization, is a next-generation system capable of achieving higher-speed and larger-volume communications than the 3rd and 3.5th generation cellular radio communication systems currently in operation.

In the LTE system, a radio base station periodically receives uplink control information from a radio terminal through an uplink control channel (PUCCH: Physical Uplink Control CHannel). The uplink control information includes information (CQI: Channel Quality Indicator) indicating a reception quality of a radio signal received by the radio terminal (that is, a radio quality of a downlink). The uplink control channel employs code division multiplexing using an orthogonal sequence and can multiplex multiple radio terminals by using one frequency resource (RB: Resource Block).

In the LTE system, the radio base station also assigns timing setting parameters and control channel setting parameters to radio terminals connected to the radio base station. The timing setting parameters are provided for determining transmission timing of the uplink control information. The control channel setting parameters are provided for determining the orthogonal sequence used for transmitting the uplink control information. The timing setting parameters as described above are referred to as cqi-pmi-ConfigIndex or $I_{CQI/PMI}$, while the control channel setting parameters are referred to as cqi-PUCCH-ResourceIndex or $n^{(2)}_{PUCCH}$ (See Non-Patent Literatures 1 and 2).

CITATION LIST

Non-Patent Literature

Non-Patent Literature 1: 3GPP TS 36.211, V9.1.0 (2010-03), Physical Channels and Modulation
Non-Patent Literature 2: 3GPP TS 36.213, V9.1.0 (2010-03), Physical layer procedures

SUMMARY OF THE INVENTION

Non-patent Literatures 1 and 2, however, do not describe a concrete method for assigning the timing setting parameters and the control channel setting parameters to a radio terminal, and thus there arises the following problem.

For example, suppose a case where the transmission timing of the uplink control information determined according to the timing setting parameter causes overlap among multiple radio terminals. When the same control channel setting parameters are as signed to the multiple radio terminals, the multiple radio terminals use the same orthogonal sequence, and thus the uplink control channel for the multiple radio terminals cannot be multiplexed. In particular, the larger the number of radio terminals connected to one radio base station is, the higher the possibility of such a problem occurrence is.

It is conceived that, to avoid such a problem, frequency resources used as the uplink control channel are increased, so that the multiple radio terminals are multiplexed by using frequency division. Note that the number of frequency resources used as the uplink control channel is determined according to a frequency-resource-number setting parameter referred to as nRB-CQI or $N^{(2)}_{RB}$.

However, when the frequency resources used as the uplink control channel are increased by using the frequency-resource-number setting parameter, the following problems occur. Specifically, frequency resources usable as an uplink data channel (PUSCH: Physical Uplink Shared CHannel) for transmitting user data are reduced, and the uplink control channel largely interferes with the uplink data channel. Accordingly, the throughput of an uplink becomes low.

It is conceived that, to avoid the aforementioned problem, multiple timing setting parameters which might cause overlap of the transmission timing of the uplink control information are combined respectively with different control channel setting parameters for assignment. With such an assignment method, even in the case where the transmission timing of the uplink control information determined according to the timing setting parameters cause overlap among the multiple radio terminals, the multiple radio terminals use different orthogonal sequences, and thus the uplink control channel for the multiple radio terminals can be multiplexed.

Nevertheless, there are a large number of the timing setting parameters. This leads to cumbersome management of assignment states of the timing setting parameters involved with connection and disconnection of the radio terminals, and thus causes a problem that the assignment method as described above is difficult to employ.

Hence, a first object of the present invention is to provide a radio base station and a control method therefor which make it possible to multiplex an uplink control channel for a large number of radio terminals by using a small number of frequency resources.

In addition, a second object of the present invention is to provide a radio base station and a control method therefor which make it possible to facilitate management of timing setting parameters to thereby flexibly respond to connection and disconnection of a radio terminal.

To achieve the aforementioned first object, the present invention has a feature as below. A first feature of a radio terminal according to the present invention is summarized as follows. A radio base station (radio base station eNB) configured to periodically receive uplink control information including information indicating a radio quality of a downlink through an uplink control channel multiplexed by an orthogonal sequence, comprises: a storage unit (storage unit 130) configured to store a plurality of combinations of a timing setting parameter (cqi-pmi-ConfigIndex ($I_{CQI/PMI}$)) for determining transmission timing of the uplink control information and a control channel setting parameter (cqi-PUCCH-ResourceIndex ($n^{(2)}_{PUCCH}$)) for determining the orthogonal sequence used for transmitting the uplink control information; and a parameter assignment unit (parameter assignment unit 121) configured to assign one of the combinations of the timing setting parameter and the control channel setting parameter which are stored by the storage unit, to a radio terminal (radio terminal UE) connected to the radio base station, wherein the storage unit stores the combinations while combining a plurality of the timing setting parameters which possibly cause overlap of the transmission timing of the uplink control information respectively with different control channel setting parameters.

Another feature of the radio base station according to the present invention is summarized as follows. Specifically, in the aforementioned first feature, the parameter assignment unit assigns one of unassigned timing setting parameters to the radio terminal in an ascending order of an interval of the transmission timing of the uplink control information.

Another feature of the radio base station according to the present invention is summarized as follows. Specifically, in the aforementioned first feature, the parameter assignment unit assigns unassigned timing setting parameters in a descending order of an interval of the transmission timing of the uplink control information.

Another feature of the radio base station according to the present invention is summarized as follows. Specifically, in the aforementioned first feature, the storage unit groups a plurality of the timing setting parameters having the same interval of the transmission timing of the uplink control information and stores the groups.

A feature of a control method according to the present invention is summarized as follows. A control method for a radio base station configured to periodically receive uplink control information including information indicating a radio quality of a downlink through an uplink control channel multiplexed by an orthogonal sequence, comprises the steps of: storing a plurality of combinations of a timing setting parameter for determining transmission timing of the uplink control information and a control channel setting parameter for determining the orthogonal sequence used for transmitting the uplink control information; and assigning one of the plurality of combinations of the timing setting parameter and the control channel setting parameter which are stored in the storing step, to a radio terminal connected to the radio base station, wherein in the storing step, the combinations are stored while a plurality of the timing setting parameters which possibly cause overlap of the transmission timing of the uplink control information are respectively combined with different control channel setting parameters.

To achieve the aforementioned second object, the present invention has a feature as below. A second feature of the radio base station according to the present invention is summarized as follows. Specifically, a radio base station (a radio base station eNB) periodically receives uplink control information including information indicating a radio quality of a downlink through an uplink control channel employing code division multiplexing. The radio base station includes a storage unit (a storage unit 130) and a parameter assignment unit (a parameter assignment unit 121). The storage unit is configured to store multiple combinations of timing setting parameters (cqi-pmi-ConfigIndex ($I_{CQI/PMI}$)) for determining transmission timing of the uplink control information and control channel setting parameters (cqi-PUCCH-ResourceIndex ($n^{(2)}_{PUCCH}$)) for determining an orthogonal sequence used for transmitting the uplink control information. The parameter assignment unit is configured to assign one of the combinations of the timing setting parameter and the control channel setting parameter which are stored by the storage unit, to a radio terminal (a radio terminal UE) connected to the radio base station. The storage unit groups multiple timing setting parameters having the same value of an interval of the transmission timing of the uplink control information, stores the groups, and stores a bit map for each group, the bit map showing an assignment state of each of the timing setting parameters. The parameter assignment unit identifies unassigned timing setting parameters by using the bit map for each group stored by the storage unit. [0020]

Another feature of the radio base station according to the present invention is summarized as follows. Specifically, in the aforementioned second feature, the parameter assignment unit assigns the unassigned timing setting parameters in an ascending order of the interval of the transmission timing of the uplink control information.

Another feature of the radio base station according to the present invention is summarized as follows. Specifically, in the aforementioned second feature, the parameter assignment unit assigns unassigned timing setting parameters in a descending order of the interval of the transmission timing of the uplink control information.

Another feature of the radio base station according to the present invention is summarized as follows. Specifically, in the aforementioned second feature, the storage unit stores the combinations while combining a plurality of the timing setting parameters which possibly cause overlap of the transmission timing of the uplink control information respectively with different control channel setting parameters.

A feature of a control method according to the present invention is summarized as follows. A control method for a radio base station configured to periodically receive uplink control information including information indicating a radio quality of a downlink through an uplink control channel employing code division multiplexing, comprises the steps of: storing a plurality of combinations of a timing setting parameter for determining transmission timing of the uplink control information and a control channel setting parameter for determining an orthogonal sequence used for transmitting the uplink control information; and assigning one of the combinations of the timing setting parameter and the control channel setting parameter which are stored in the storing step, to a radio terminal connected to the radio base station, wherein in the storing step, a plurality of the timing setting parameters having the same interval of the transmission timing of the uplink control information are grouped, the groups are stored, and a bit map is stored for each group, the bit map showing an assignment state of each of the timing setting parameters, and in the assigning step, unassigned the timing setting parameters are identified by using the bit map for each group stored in the storing step.

BRIEF DESCRIPTION OF THE DRAWINGS

FIG. 3 is a chart for explaining cqi-pmi-ConfigIndex ($I_{CQI/PMI}$) according to the embodiment of the present invention.

FIG. 4 is a block diagram showing the configuration of a radio base station according to the embodiment of the present invention.

FIG. 5 is a diagram explaining a mapping table according to the embodiment of the present invention.

FIG. 6 is a diagram explaining a parameter assignment group according to the embodiment of the present invention.

DESCRIPTION OF THE EMBODIMENTS

Figure 1:
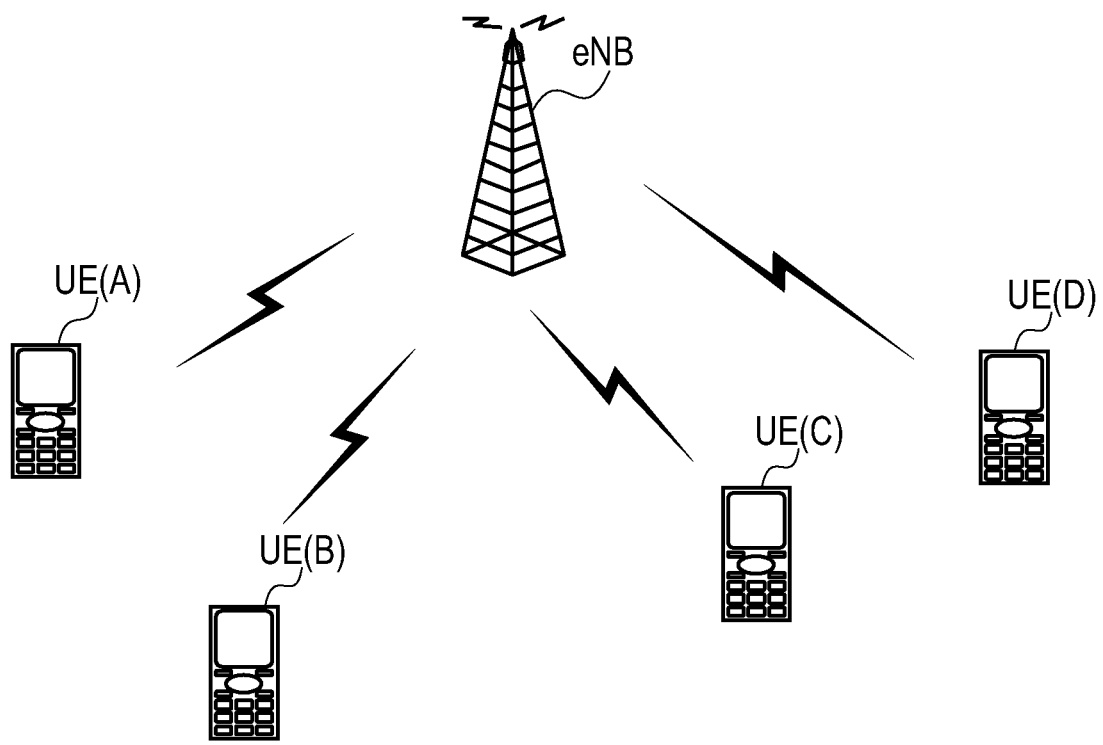
FIG. 1 is an overall configuration diagram of a radio communication system according to an embodiment of the present invention.

With reference to the drawings, descriptions are given of embodiments according to the present invention, in the order of (1) Overview of Radio Communication System, (2) Configuration of Radio Base Station, (3) Operations of Radio Base Station, (4) Effects of Embodiment, and (5) Other Embodiments. In the drawings for the embodiments, the same or similar reference signs are applied to the same or similar parts.

(1) Overview of Radio Communication System

FIG. 1 is an overall configuration diagram of a radio communication system according to this embodiment. The radio communication system based on 3GPP Release 8 or Release 9 (LTE) will be described in this embodiment.

In the radio communication system, an SC-FDMA (Single Carrier-Frequency Division Multiple Access) scheme is applied to an uplink, and an OFDMA (Orthogonal Frequency Division Multiple Access) scheme is applied to a downlink.

A radio base station eNB forms a cell which is a communication area where radio terminals UE should be provided with services. The radio terminal UE is a radio communication device held by a user and is also referred to as a user device. Multiple radio terminals UE (A) to UE (D) in the cell of the radio base station eNB are connected to the radio base station eNB.

When the radio terminals UE is connected to the radio base station eNB, the radio base station eNB establishes an uplink control channel (PUCCH: Physical Uplink Control CHannel) and an uplink data channel (PUSCH: Physical Uplink Shared CHannel) in an uplink between the radio base station eNB and the radio terminal UE, and establishes a downlink control channel (PDCCH: Physical Downlink Control CHannel) and a downlink data channel (PDSCH: Physical Downlink Shared CHannel) in a downlink between the radio base station eNB and the radio terminal UE.

The PUCCH is a channel for transmitting uplink control data, while the PUSCH is a channel for transmitting uplink user data. In addition, the PDCCH is a channel for transmitting downlink control data, and the PUSCH is a channel for transmitting downlink user data.

The uplink control data includes a CQI (Channel Quality Indicator) which is information indicating the radio quality of the downlink. The radio terminal UE measures, for example, a signal to interference plus noise ratio (SINR) of a radio signal received from the radio base station eNB, and transmits an index of the SINR as the CQI to the radio base station eNB. The PUCCH allowing the uplink control data including the CQI to be transmitted is referred to as a PUCCH format 2/2a/2b (hereinafter, a PUCCH format 2). Note that the PUCCH format 2 may include not only the CQI but also a precoding matrix indicator (PMI) and a rank indicator (RI) which are for multi-antenna transmission in the downlink and acknowledge/negative acknowledge (ACK/NAK) indicating whether decoding of downlink user data succeeds or fails.

The radio base station eNB periodically receives uplink control information including the CQI from the radio terminal UE through the PUCCH (specifically, the PUCCH format 2). The PUCCH is multiplexed by using an orthogonal sequence, and can multiplex the multiple radio terminals UE by using one frequency resource (hereinafter, a resource block).

FIG. 2 is a diagram for explaining a communication frame structure used in the radio communication system according to this embodiment.

Figure 2A:
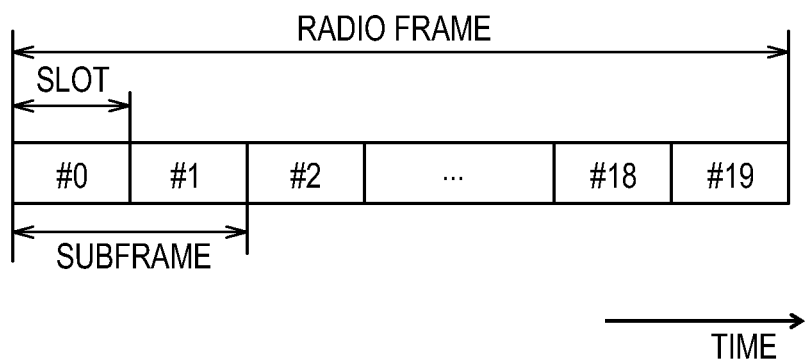
FIG. 2A is a diagram explaining a radio frame used for the radio communication system according to the embodiment of the present invention (part 1).

As shown in FIG. 2A, a radio frame is constituted of 10 subframes, and each subframe is constituted of two slots. The subframe has a length of 1 ms, and each slot has a length of 0.5 ms. In addition, each slot includes seven SC-FDMA symbols in a temporal axis direction (in a time domain) and includes resource blocks the number of which is provided according to an uplink bandwidth, in a frequency axis direction (in a frequency domain). Each resource block includes 12 sub-carriers in the frequency axis direction.

Figure 2B:
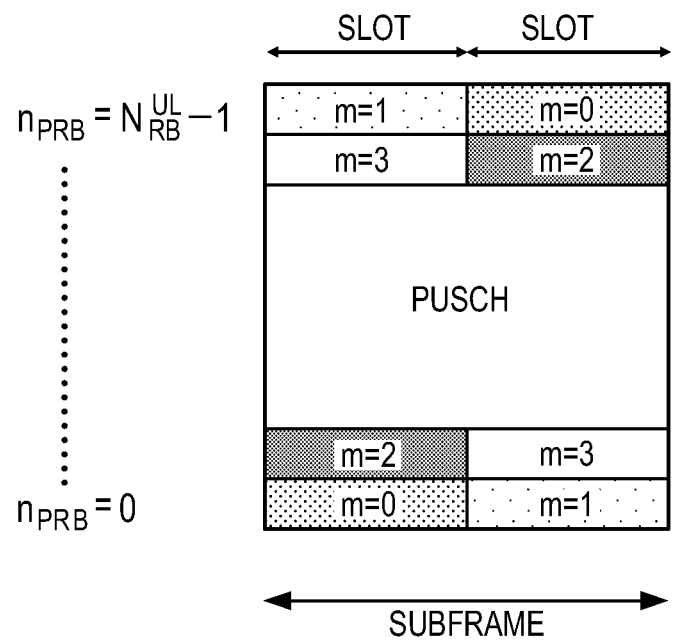
FIG. 2B is a diagram explaining a radio frame used for the radio communication system according to the embodiment of the present invention (part 2).

As shown in FIG. 2B, in each subframe used in the uplink, the resource blocks at the both ends of an uplink frequency band form the PUCCH, and the resource block in the center part of the uplink frequency band forms the PUSCH. Each resource block in each of the two slots in the subframe is used as a single PUCCH resource. At this time, frequency hopping using the both ends of the uplink band is applied to the slots in the subframe. For example, the hopping is performed in such a manner that a resource block on the low frequency side is used in the earlier slot and a resource block on the high frequency side is used in the later slot.

The PUCCH resource is shared by the multiple radio terminals UE. Specifically, the radio base station eNB assigns different phase rotations to the respective radio terminals UE and performs the phase rotations on a basic sequence unique to the radio base station eNB in the frequency domain to obtain different orthogonal sequences. The phase rotations in the frequency domain are equivalent to cyclic shifts in the time domain. For example, 12 different phase rotations (cyclic shifts) are provided. The 12 different orthogonal sequences enable multiplexing for the 12 radio terminals UE by using one PUCCH resource.

The radio base station eNB determines: timing at which the radio terminal UE transmits the uplink control information through the PUCCH; and an orthogonal sequence used to transmit the uplink control information by the radio terminal UE, for each radio terminal UE in accordance with a radio resource control (RRC) protocol in an upper layer.

Specifically, the radio base station eNB assigns cqi-pmi-ConfigIndex ($I_{CQI/PMI}$) and cqi-PUCCH-ResourceIndex ($n^{(2)}_{PUCCH}$) to each of the radio terminals UE connected to the radio base station eNB, cqi-pmi-ConfigIndex ($I_{CQI/PMI}$) being an RRC parameter for determining transmission timing of the uplink control information, cqi-PUCCH-ResourceIndex ($n^{(2)}_{PUCCH}$) being an RRC parameter for determining the orthogonal sequences used for transmitting the uplink control information.

FIG. 3 is a chart for explaining cqi-pmi-ConfigIndex ($IC_{CQI/PMI}$).

As shown in FIG. 3, cqi-pmi-ConfigIndex ($I_{CQI/PMI}$) is associated with an interval $N_P$ for transmitting the uplink control information and an offset $N_{OFFSET, CQI}$ of a cycle for transmitting the uplink control information. Here, values of the interval $N_P$ and the offset $N_{OFFSET, CQI}$ are determined on a subframe basis. The transmission timing of the uplink control information is determined according to cqi-pmi-ConfigIndex ($I_{CQI/PMI}$) by using the following formula:

$$(10 \times n_f + \lfloor n_s/2 \rfloor - N_{OFFSET, CQI}) \bmod N_P = 0 \quad \text{[Formula 1]}$$

where, $n_f$ is a frame number, and $n_s$ is a slot number. For details of cqi-pmi-ConfigIndex ($I_{CQI/PMI}$), see Non-patent Literatures 1 and 2.

Note that, in the association, values of cqi-pmi-ConfigIndex ($I_{CQI/PMI}$) associated with the same interval $N_P$ do not cause a transmission timing overlap due to the offset $N_{OFFSET, CQI}$.

$\alpha(n_s, 1)$ corresponding to the phase rotation (cyclic shift) assigned to the radio terminal UE is determined according to cqi-PUCCH-ResourceIndex ($n^{(2)}_{PUCCH}$) by using the following formula:

$$\alpha(n_s, l) = 2\pi \cdot n_{cs}(n_s, l) / N_{sc}^{RB}$$ [Formula 2]

where $$n_{cs}(n_s, l) = (n_{cs}^{cell}(n_s, l) + n'(n_s)) \bmod N_{SC}^{RB}$$

and $$n'(n_s) = \begin{cases} n^{(2)}_{PUCCH} \bmod N_{sc}^{RB} & \text{if } n^{(2)}_{PUCCH} < N_{sc}^{RB} N_{RB}^{(2)} \\ (n^{(2)}_{PUCCH} + N_{cs}^{(1)} + 1) \bmod N_{sc}^{RB} & \text{otherwise} \end{cases}$$

for $n_s \bmod 2 = 0$ and by $$n'(n_s) = \begin{cases} [N_{sc}^{RB}(n'(n_s - 1) + 1)] \bmod (N_{sc}^{RB} + 1) - 1 & \text{if } n^{(2)}_{PUCCH} < N_{sc}^{RB} N_{RB}^{(2)} \\ (N_{sc}^{RB} - 2 - n^{(2)}_{PUCCH}) \bmod N_{sc}^{RB} & \text{otherwise} \end{cases}$$

for $n_s \bmod 2 = 1$.

For details of the formula, see Non-patent Literatures 1 and 2.

Moreover, the radio base station eNB can determine the number of the resource blocks to be used for the PUCCH format 2, by using an RRC parameter called $N^{(2)}_{RB}$ in accordance with an RRC protocol.

(2) Configuration of Radio Base Station

Next, a description is given of a configuration of the radio base station eNB according to this embodiment. FIG. 4 is a block diagram showing the configuration of the radio base station eNB according to this embodiment.

As shown in FIG. 4, the radio base station eNB includes an antenna unit 101, a radio communication unit 110, a controller 120, a storage unit 130, and a network communication unit 140.

The radio communication unit 110 is configured by using, for example, a radio frequency (RF) circuit, a baseband (BB) circuit, and the like, and transmits and receives radio signals from and to the radio terminals UE through the antenna unit 101. The radio communication unit 110 also modulates transmission signals and demodulates reception signals.

The controller 120 is configured by using, for example, a CPU and controls various functions of the radio base station eNB. The storage unit 130 is configured by using, for example, a memory and stores various information used for control and the like of the radio base station eNB. The storage unit 130 stores a table for cqi-pmi-ConfigIndex (ICQI/PMI) shown in FIG. 3. The network communication unit 140 communicates with apparatuses at a higher level than the radio base station eNB and other radio base stations.

The storage unit 130 stores a mapping table for associating cqi-pmi-ConfigIndex ($IC_{CQI/PMI}$) and cqi-PUCCH-ResourceIndex ($n^{(2)}_{PUCCH}$) with each other. As shown in FIG. 5, cqi-pmi-ConfigIndex ($I_{CQI/PMI}$) of "0" to "1" are associated with cqi-PUCCH-ResourceIndex ($n^{(2)}_{PUCCH}$) of "0" in the mapping table. Cqi-pmi-ConfigIndex ($I_{CQI/PMI}$) of "2" to "6" are associated with cqi-PUCCH-ResourceIndex ($n^{(2)}_{PUCCH}$) of "1". Cqi-pmi-ConfigIndex ($I_{CQI/PMI}$) of "7" to "16" are associated with cqi-PUCCH-ResourceIndex ($n^{(2)}_{PUCCH}$) of "2". Cqi-pmi-ConfigIndex ($I_{CQI/PMI}$) of "17" to "36" are associated with cqi-PUCCH-ResourceIndex of ($n^{(2)}_{PUCCH}$) "3". Cqi-pmi-ConfigIndex ($I_{CQI/PMI}$) of "37" to "76" are associated with cqi-PUCCH-ResourceIndex ($n^{(2)}_{PUCCH}$) of "4". Cqi-pmi-ConfigIndex ($I_{CQI/PMI}$) of "77" to "156" are associated with cqi-PUCCH-ResourceIndex ($n^{(2)}_{PUCCH}$) of "5". Cqi-pmi-ConfigIndex ($I_{CQI/PMI}$) of "157" to "316" are associated with cqi-PUCCH-ResourceIndex ($n^{(2)}_{PUCCH}$) of "6". Cqi-pmi-ConfigIndex ($I_{CQI/PMI}$) of "317" is reserved. Cqi-pmi-ConfigIndex ($I_{CQI/PMI}$) of "318" to "349" are associated with cqi-PUCCH-ResourceIndex ($n^{(2)}_{PUCCH}$) of "7". Cqi-pmi-ConfigIndex ($I_{CQI/PMI}$) of "350" to "413" are associated with cqi-PUCCH-ResourceIndex ($n^{(2)}_{PUCCH}$) of "8". Cqi-pmi-ConfigIndex ($I_{CQI/PMI}$) of "414" to "541" are associated with cqi-PUCCH-ResourceIndex ($n^{(2)}_{PUCCH}$) of "9". Cqi-pmi-ConfigIndex ($I_{CQI/PMI}$) of "542" to "1023" are reserved.

As described above, the values of cqi-pmi-ConfigIndex ($I_{CQI/PMI}$) which are associated with the same interval $N_P$ are combined with one cqi-PUCCH-Resource Index ($n^{(2)}_{PUCCH}$). In addition, the values of cqi-pmi-ConfigIndex ($I_{CQI/PMI}$) which are respectively associated with the different interval $N_P$ are respectively combined with the different cqi-PUCCH-ResourceIndex ($n^{(2)}_{PUCCH}$).

As described above, in the combinations, cqi-pmi-ConfigIndex ($I_{CQI/PMI}$) associated with the same interval $N_P$ is configured not cause the transmission timing overlap due to the offset $N_{OFFSET, CQI}$. In contrast, cqi-pmi-ConfigIndex ($I_{CQI/PMI}$) associated with the different the interval $N_P$ could cause overlap of the transmission timing of the uplink control information.

Hence, the storage unit 130 stores cqi-pmi-ConfigIndex ($I_{CQI/PMI}$) associated with the different interval $N_P$, that is, the multiple cqi-pmi-ConfigIndex ($I_{CQI/PMI}$) which could cause overlap of the transmission timing of the uplink control information, respectively in combination with the different cqi-PUCCH-ResourceIndex ($n^{(2)}_{PUCCH}$).

Figure 8A:
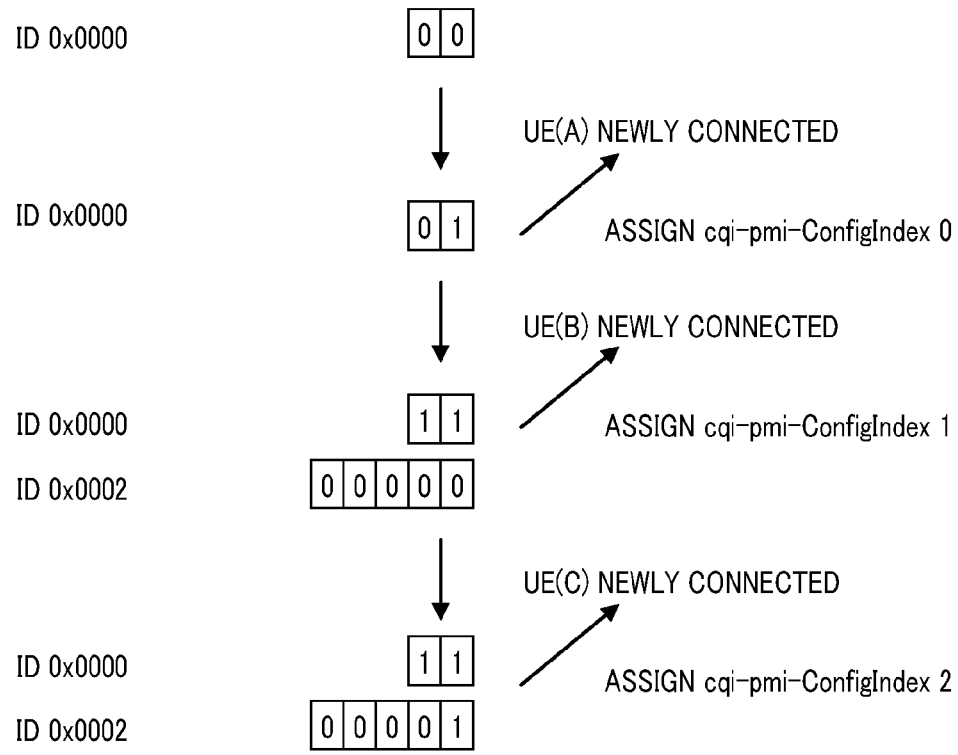
FIG. 8A is a diagram explaining a parameter management operation of the base station according to the embodiment of the present invention (part 1).

Further, as shown in FIG. 6, the storage unit 130 groups and stores cqi-pmi-ConfigIndex ($I_{CQI/PMI}$) having the same interval $N_P$ together, and stores bit maps (see FIG. 8 and FIG. 9) showing an assignment state of each cqi-pmi-ConfigIndex ($I_{CQI/PMI}$) for each group.

Specifically, the storage unit 130 associates each group of cqi-pmi-ConfigIndex ($I_{CQI/PMI}$) with an assignment-management group ID for identifying the group. In this embodiment, cqi-pmi-ConfigIndex (ICQI/PMI) of "0" to "1" are associated with an assignment-management group ID of "0x0000". Cqipmi-ConfigIndex (ICQI/PMI) of "2" to "6" are associated with an assignment-management group ID of "0x0002". Cqi-pmi-ConfigIndex (ICQI/PMI) of "7" to "16" are associated with an assignment-management group ID of "0x0007". Cqi-pmi-ConfigIndex (ICQI/PMI) of "17" to "36" are associated with an assignment-management group ID of "0x0011". Cqi-pmi-ConfigIndex (ICQI/PMI) of "37" to "76" are associated with an assignment-management group ID of "0x0025". Cqi-pmi-ConfigIndex (ICQI/PMI) of "77" to "156" are associated with an assignment-management group ID of "0x004D". Cqi-pmi-ConfigIndex (ICQI/PMI) of "157" to "316" are associated with an assignment-management group ID of "0x009D". Cqi-pmi-ConfigIndex ($I_{CQI/PMI}$) of "317" is reserved. Cqi-pmi-ConfigIndex (ICQI/PMI) of "318" to "349" are associated with an assignment-management group ID of "0x013E". Cqi-pmi-ConfigIndex (ICQI/PMI) of "350" to "413" are associated with an assignment-management group ID of "0x015E". Cqi-pmi-ConfigIndex (ICQI/PMI) of "414" to "541" are associated with an assignment-management group ID of "0x019E". Cqi-pmi-ConfigIndex (ICQI/PMI) of "542" to "1023" are reserved.

As described above, lower bits of the assignment-management group ID corresponds to the smallest value in the corresponding group of cqi-pmi-ConfigIndex ($I_{CQI/PMI}$). In addition, four higher bits of the assignment-management group ID is a value corresponding to the number of resource blocks determined according to $N^{(2)}_{RB}$. The aforementioned examples are provided on the assumption that $N^{(2)}_{RB}=1$. However, when $N^{(2)}_{RB}=2$, the assignment-management group IDs are managed while being divided into a group of 0x0000, 0x0002, . . . and a group of 0x1000, 0x1002, . . . .

When $N^{(2)}_{RB}$ is 16 or larger, the higher four bits is too short to express the number. Thus, the number of bits of each assignment-management group ID needs to be extended.

The controller 120 has a parameter assignment unit 121, a parameter notification unit 122, and a parameter manager 123.

The parameter assignment unit 121 assigns the parameters for the PUCCH to the radio terminals UE which are newly connected to (register with) the radio base station eNB. Specifically, the parameter assignment unit 121 uniquely assigns one of combinations of the parameters of cqi-pmi-ConfigIndex ($I_{CQI/PMI}$) and the parameters of cqi-PUCCH-ResourceIndex ($n^{(2)}_{PUCCH}$) which are stored in the storage unit 130, to the radio terminals UE connected to the radio base station eNB. The parameter assignment unit 121 identifies an unassigned cqi-pmi-ConfigIndex ($I_{CQI/PMI}$) by using the bit map for each assignment management group stored in the storage unit 130.

The parameter notification unit 122 notifies the radio terminal UE connected to the radio base station eNB of the combination of cqi-pmi-ConfigIndex ($I_{CQI/PMI}$) and cqi-PUCCH-ResourceIndex ($n^{(2)}_{PUCCH}$) which is assigned by the parameter assignment unit 121.

The parameter manager 123 manages the assignment state of cqi-pmi-ConfigIndex ($I_{CQI/PMI}$). Specifically, the parameter manager 123 updates the bit map for each assignment management group stored by the storage unit 130 in response to connection or disconnection with the radio terminal UE.

(3) Operations of Radio Base Station

Next, descriptions are given of operations of the radio base station eNB according to this embodiment, in the order of (3.1) Parameter Assignment Operation and (3.2) Parameter Management Operation.

(3.1) Parameter Assignment Operation

As described above, the transmission interval for the PUCCH format 2 is obtained based on cqi-pmi-ConfigIndex ($I_{CQI/PMI}$) which is one of the RRC parameters. In addition, since the transmission interval for the PUCCH format 2 have common divisors among rows of the table in FIG. 3, a subframe might be transmitted in the PUCCH format 2 according to the transmission interval set in the rows from the radio terminals UE. Hence, when connecting the radio terminal UE, the radio base station eNB assigns a combination of cqi-pmi-ConfigIndex ($I_{CQI/PMI}$) and cqi-PUCCH-ResourceIndex ($n^{(2)}_{PUCCH}$) in the following manner.

Figure 7:
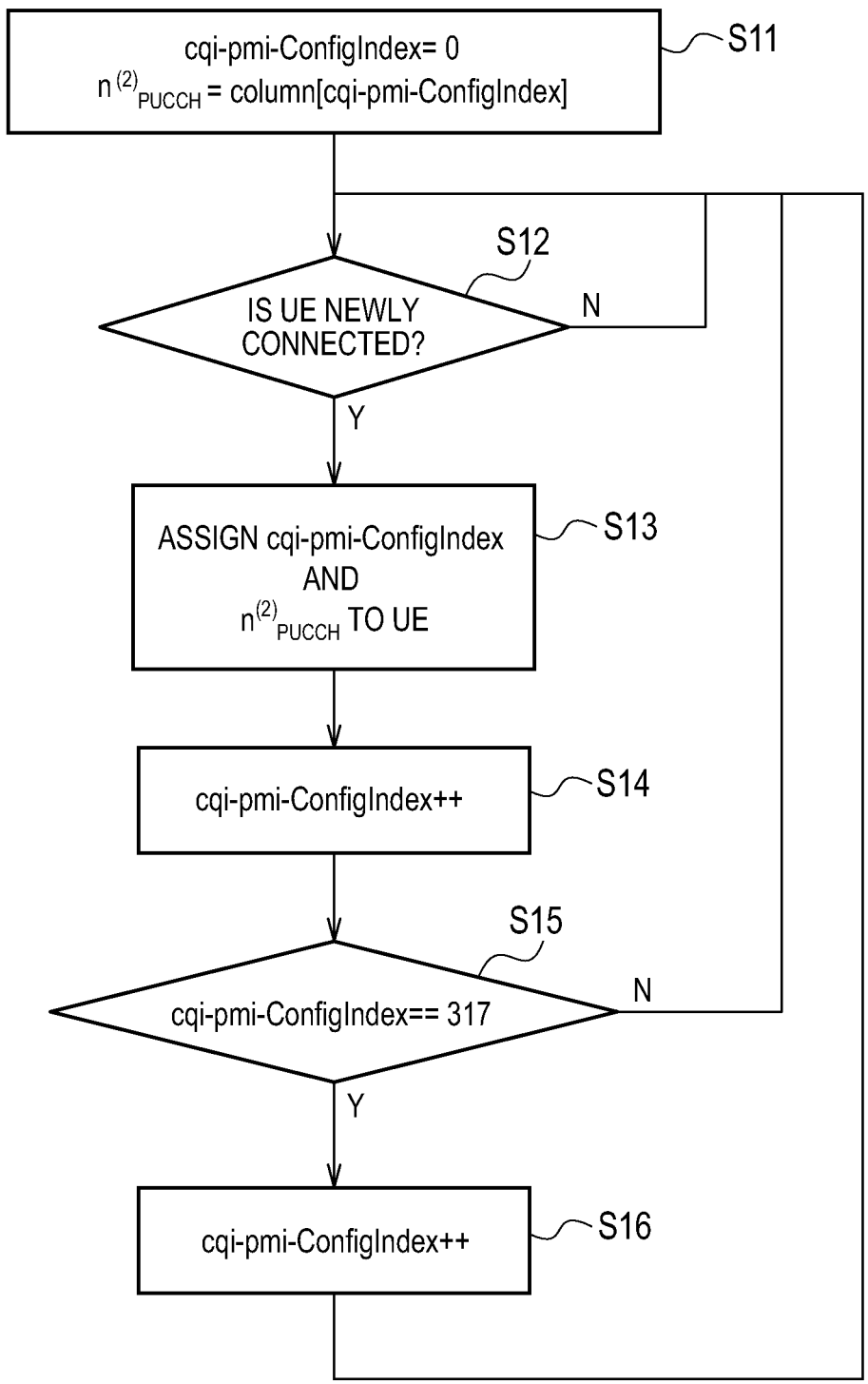
FIG. 7 is a flowchart showing an example of the parameter assignment operation by the radio base station according to the embodiment of the present invention.

FIG. 7 is a flowchart showing an example of the parameter assignment operation by the radio base station eNB.

In Step S11, the parameter assignment unit 121 sets a value of cqi-pmi-ConfigIndex ($I_{CQI/PMI}$) to 0. The parameter assignment unit 121 also refers to the mapping table shown in FIG. 5 and sets a value of cqi-PUCCH-ResourceIndex ($n^{(2)}_{PUCCH}$) to a value corresponding to the value of cqi-pmi-ConfigIndex ($I_{CQI/PMI}$). In this case, the parameter assignment unit 121 sets cqi-PUCCH-ResourceIndex ($n^{(2)}_{PUCCH}$) to "0" which corresponds to cqi-pmi-ConfigIndex ($I_{CQI/PMI}$) of "0".

When the radio terminal UE is newly connected to the radio base station eNB (Step S12; YES), in Step S13, the parameter assignment unit 121 assigns the current cqi-pmi-ConfigIndex ($I_{CQI/PMI}$) and the current cqi-PUCCH-ResourceIndex ($n^{(2)}_{PUCCH}$) to the newly connected radio terminal UE.

In Step S14, the parameter assignment unit 121 increments the current value of cqi-pmi-ConfigIndex ($I_{CQI/PMI}$) by one. If the value of cqi-pmi-ConfigIndex ($I_{CQI/PMI}$) does not reach 317 (Step S15; NO), the processing returns to Step S12. If the value of cqi-pmi-ConfigIndex ($I_{CQI/PMI}$) reaches 317 (Step S15; YES), the parameter assignment unit 121 further increments the value of cqi-pmi-ConfigIndex ($I_{CQI/PMI}$) by one, and then the processing returns to Step S12.

As described above, when incremented cqi-pmi-ConfigIndex ($I_{CQI/PMI}$) is assigned, a different cqi-PUCCH-ResourceIndex ($n^{(2)}_{PUCCH}$) in the rows in the tables in FIG. 3 and FIG. 4 is assigned to the radio terminal UE. As the result, even in a case where the transmission timing of the uplink control information causes overlap among the multiple radio terminals UE, $\alpha(n_s, 1)$ of each of the multiple radio terminals UE is offset, so that multiplexing for the multiple radio terminals UE is achieved.

When nRB-CQI ($N^{(2)}_{RB}$)=1, such a method makes it possible to assign one resource block for the PUCCH format 2 to up to 541 radio terminals UE, thus achieving up to 10 multiplexing per resource block in one subframe. In addition, load of processing of detecting the PUCCH format 2 in the radio base station eNB is 10/12 even in the worst case. Note that, for 1000 radio terminals UE, nRB-CQI ($N^{(2)}_{RB}$)=2 may be employed.

(3.2) Parameter Management Operation

FIG. 8 is a diagram for explaining the parameter management operation by the radio base station eNB.

The bit map for each assignment management group stored in the storage unit 130 is formed by a bit sequence having the number of bits corresponding to the number of elements of cqi-pmi-ConfigIndex ($I_{CQI/PMI}$). An initial value of each bit is 0. In an example in FIG. 8A, the bit map of the group of the assignment-management group ID of "0x0000" is constituted of a bit corresponding to cqi-pmi-ConfigIndex ($I_{CQI/PMI}$) of "0" and a bit corresponding to cqi-pmi-ConfigIndex ($I_{CQI/PMI}$) of "1".

Assume a case where the radio terminal UE(A) is newly connected to the radio base station eNB. The parameter assignment unit 121 assigns cqi-pmi-ConfigIndex ($I_{CQI/PMI}$) of "0" to the radio terminal UE(A). The parameter manager 123 inverts the bit corresponding to cqi-pmi-ConfigIndex ($I_{CQI/PMI}$) of "0" from "0" to "1". Here, the bit of "1" means that the corresponding cqi-pmi-ConfigIndex ($I_{CQI/PMI}$) has been assigned. Thereby, when searching for an unassigned cqi-pmi-ConfigIndex ($I_{CQI/PMI}$), the parameter assignment unit 121 can identify the unassigned cqi-pmi-ConfigIndex ($I_{CQI/PMI}$) by referring to the bit map.

In addition, assume a case where the radio terminal UE (B) is newly connected to the radio base station eNB. The parameter assignment unit 121 assigns cqi-pmi-ConfigIndex ($I_{CQI/PMI}$) of "1" to the radio terminal UE (B). The parameter manager 123 inverts the bit corresponding to cqi-pmi-ConfigIndex ($I_{CQI/PMI}$) of "1" from "0" to "1".

Further, assume a case where the radio terminal UE(C) is newly connected to the radio base station eNB. The parameter assignment unit 121 assigns cqi-pmi-ConfigIndex ($I_{CQI/PMI}$) of "2" to the radio terminal UE (C). The parameter manager 123 inverts a bit corresponding to cqi-pmi-ConfigIndex ($I_{CQI/PMI}$) of "2" from "0" to "1".

When a certain radio terminal UE is disconnected (including handover), the parameter manager 123 inverts a bit corresponding to cqi-pmi-ConfigIndex ($I_{CQI/PMI}$) which has been assigned to the disconnected radio terminal UE from "1" to "0". Therefore, the parameter assignment unit 121 can judge that cqi-pmi-ConfigIndex ($I_{CQI/PMI}$) which has been assigned to the disconnected radio terminal UE is currently unassigned.

Figure 8B:
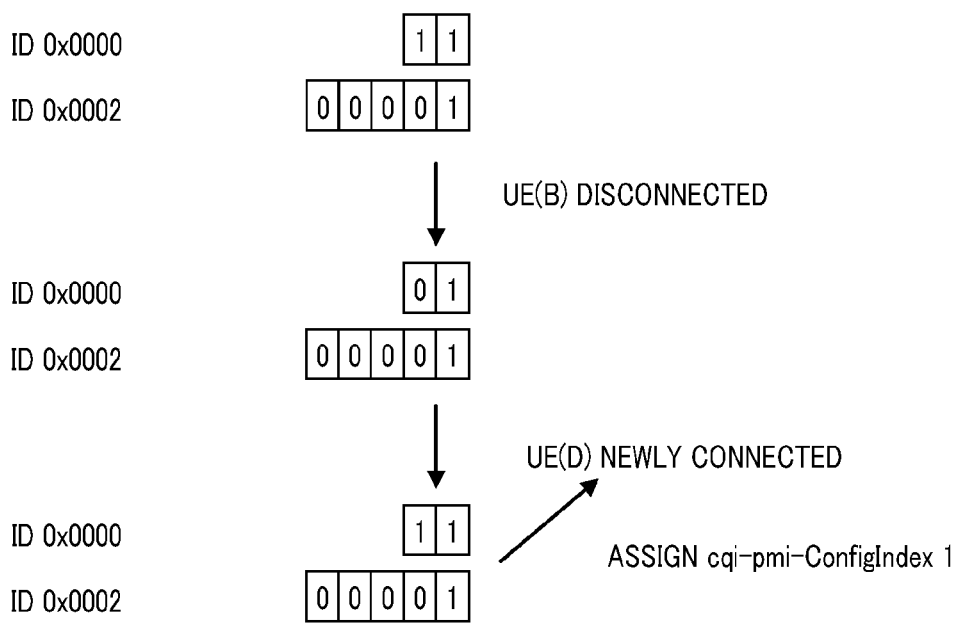
FIG. 8B is a diagram explaining a parameter management operation of the base station according to the embodiment of the present invention (part 2).

In an example in FIG. 8B, the radio terminal UE(B) is disconnected. The parameter manager 123 inverts the bit corresponding to cqi-pmi-ConfigIndex ($I_{CQI/PMI}$) of "1" which has been assigned to the radio terminal UE(B) from "1" to "0". In addition, assume a case where the radio terminal UE(D) is newly connected to the radio base station eNB. The parameter assignment unit 121 judges that cqi-pmi-ConfigIndex ($I_{CQI/PMI}$) of "1" is unassigned based on the bit map, and assigns cqi-pmi-ConfigIndex ($I_{CQI/PMI}$) of "1" to the radio terminal UE(D).

(4) Effects of Embodiment

As has been described above, the radio base station eNB includes: the storage unit 130 which combines the multiple values of cqi-pmi-ConfigIndex ($I_{CQI/PMI}$) which could cause overlap of the transmission timing of the uplink control information respectively with the different cqi-PUCCH-ResourceIndex ($n^{(2)}_{PUCCH}$) and stores the combinations; and the parameter assignment unit 121 which uniquely assigns one of the combinations of cqi-pmi-ConfigIndex ($I_{CQI/PMI}$) and cqi-PUCCH-ResourceIndex ($n^{(2)}_{PUCCH}$) stored by the storage unit 130, to the radio terminals UE connected to the radio base station eNB. Therefore, the transmission timing of the uplink control information determined according to the value of cqi-pmi-ConfigIndex ($I_{CQI/PMI}$) causes overlap among the multiple radio terminals UE, offsetting $\alpha(n_s, 1)$ causes the multiple radio terminals UE to use a different orthogonal sequence. Thus, the PUCCH for the multiple radio terminals UE can be multiplexed. Therefore, the radio base station eNB according to this embodiment makes it possible to multiplex the PUCCH for a large number of radio terminals by using a small number of frequency resources.

In addition, the storage unit 130 groups and stores the multiple cqi-pmi-ConfigIndex ($I_{CQI/PMI}$) having the same transmission timing interval of the uplink control information together, and stores the bit maps showing the assignment state of each cqi-pmi-ConfigIndex ($I_{CQI/PMI}$) for each assignment management group. The parameter assignment unit 121 identifies an unassigned cqi-pmi-ConfigIndex ($I_{CQI/PMI}$), by using the bit map for each assignment management group stored by the storage unit 130. This facilitates the management of the assignment state of each of a large number of the timing setting parameters and makes it possible to flexibly respond to connection or disconnection of the radio terminals UE.

In this embodiment, the parameter assignment unit 121 assigns an unassigned cqi-pmi-ConfigIndex ($I_{CQI/PMI}$) in an ascending order of the transmission timing interval of the uplink control information. This enables the radio base station eNB to perform communication control on the radio terminals UE with high accuracy and to provide the radio terminals UE with favorable communication services.

(5) Other Embodiments

As mentioned above, the present invention has been described according to the embodiment. However, it should not be understood that the discussions and the drawings constituting a part of this disclosure limit the present invention. From this disclosure, various alternative embodiments, examples and operational techniques will be apparent to those skilled in the art.

In the aforementioned embodiment, the parameter assignment unit 121 assigns an unassigned cqi-pmi-ConfigIndex ($I_{CQI/PMI}$) in the ascending order of the transmission timing interval of the uplink control information. However, the assignment order is not limited to such an assignment order. The parameter assignment unit 121 may assign an unassigned cqi-pmi-ConfigIndex ($I_{CQI/PMI}$) in a descending order of the transmission timing interval of the uplink control information. This enables the radio base station eNB to reduce the processing load related to the communication control over the radio terminals UE.

Further, the radio communication system based on 3GPP Release 8 or Release 9 (LTE) has been described in the aforementioned embodiment, the present invention may be applied to one based on 3GPP Release 10 (LTE Advanced).

It should be understood that the present invention includes various embodiments which are not described herein as mentioned above.

Note that the entire contents of Japanese Patent Applications No. 2010-119916 (filed on May 25, 2010) and No. 2010-119917 (filed on May 25, 2010) are incorporated herein by reference.

As mentioned above, the radio base station and the control method for the radio base station according to the present invention are useful for radio communication such as mobile communication, which make it possible to multiplex an uplink control channel for a large number of radio terminals by using a small number of frequency resources.

The invention claimed is:

1. A radio base station configured to periodically receive uplink control information including information indicating a radio quality of a downlink through an uplink control channel multiplexed by an orthogonal sequence, comprising:

a storage unit configured to store a plurality of parameters for determining transmission timings of the uplink control information, wherein each of the timing setting parameters corresponds to a combination of an interval for transmitting the uplink control information and an offset to prevent transmission timing overlap;

a parameter assignment unit configured to assign one of the timing setting parameters and a control channel setting parameter for determining the orthogonal sequence used for transmitting the uplink control information, to a radio terminal connected to the radio base station; and a mapping table with which the timing setting parameters corresponds to control channel setting parameters for determining the orthogonal sequence used for transmitting the uplink control information, wherein the parameter assignment unit assigns a current timing setting parameter and a control channel setting parameter corresponding to the current timing setting parameter, to a newly connected radio terminal.

2. The radio base station according to claim 1, wherein the parameter assignment unit assigns unassigned timing setting parameters in an ascending order of an interval of the transmission timing of the uplink control information.

3. The radio base station according to claim 1, wherein the parameter assignment unit assigns unassigned timing setting parameters in a descending order of an interval of the transmission timing of the uplink control information.

4. The radio base station according to claim 1, wherein the storage unit groups a plurality of the timing setting parameters having the same interval of the transmission timing of the uplink control information and stores the groups.

5. A control method for a radio base station configured to periodically receive uplink control information including information indicating a radio quality of a downlink through an uplink control channel multiplexed by an orthogonal sequence, comprising the steps of:
storing a plurality of timing setting parameters for determining transmission timings of the uplink control information, wherein each of the timing setting parameters corresponds to a combination of an interval for transmitting the uplink control information and an offset to prevent transmission timing overlap;
assigning one of the timing setting parameters and a control channel setting parameter for determining the orthogonal sequence used for transmitting the uplink control information, to a radio terminal connected to the radio base station; and
associating the timing setting parameters with control channel setting parameters for determining the orthogonal sequence used for transmitting the uplink control information,
wherein the step of assigning comprises assigning a current timing setting parameter and a control channel setting parameter corresponding to the current timing setting parameter, to a newly connected radio terminal.

6. A radio base station configured to periodically receive uplink control information including information indicating a radio quality of a downlink through an uplink control channel employing code division multiplexing, comprising:
a storage unit configured to store a plurality of combinations of a timing setting parameter for determining transmission timing of the uplink control information and a control channel setting parameter for determining an orthogonal sequence used for transmitting the uplink control information; and
a parameter assignment unit configured to assign one of the combinations of the timing setting parameter and the control channel setting parameter which are stored by the storage unit, to a radio terminal connected to the radio base station, wherein
the storage unit groups a plurality of the timing setting parameters having the same interval of the transmission timing of the uplink control information, stores the groups, and stores a bit map for each group, the bit map showing an assignment state of each value of the timing setting parameter, and
the parameter assignment unit identifies unassigned timing setting parameters by using the bit map for each group stored by the storage unit.

7. The radio base station according to claim 6, wherein the parameter assignment unit assigns the unassigned timing setting parameters in an ascending order of the interval of the transmission timing of the uplink control information.

8. The radio base station according to claim 6, wherein the parameter assignment unit assigns unassigned timing setting parameters in a descending order of the interval of the transmission timing of the uplink control information.

9. The radio base station according to claim 6, wherein the storage unit stores the combinations while combining a plurality of the timing setting parameters which possibly cause overlap of the transmission timing of the uplink control information respectively with different control channel setting parameters.

10. A control method for a radio base station configured to periodically receive uplink control information including information indicating a radio quality of a downlink through an uplink control channel employing code division multiplexing, comprising the steps of:
storing a plurality of combinations of a timing setting parameter for determining transmission timing of the uplink control information and a control channel setting parameter for determining an orthogonal sequence used for transmitting the uplink control information; and
assigning one of the combinations of the timing setting parameter and the control channel setting parameter which are stored in the storing step, to a radio terminal connected to the radio base station, wherein
in the storing step, a plurality of the timing setting parameters having the same interval of the transmission timing of the uplink control information are grouped, the groups are stored, and a bit map is stored for each group, the bit map showing an assignment state of each of the timing setting parameters, and
in the assigning step, unassigned the timing setting parameters are identified by using the bit map for each group stored in the storing step.

* * * * *